US012634665B2

(12) United States Patent
Somashekar et al.

(10) Patent No.: US 12,634,665 B2
(45) Date of Patent: May 19, 2026

(54) TELECOMMUNICATIONS-ASSISTED SYSTEM FOR PRESENTING PROXIMITY DEPENDENT OFFERINGS OF ENTITIES AT WIRELESS DEVICES

(71) Applicant: T-Mobile USA, Inc., Bellevue, WA (US)

(72) Inventors: Sharath Somashekar, Overland Park, KS (US); Sunil Kumar Gopal Reddy, Olathe, KS (US); Rashmi Kumar, Herndon, VA (US); Shruthi Ramakrishna, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 432 days.

(21) Appl. No.: 18/324,947

(22) Filed: May 26, 2023

(65) Prior Publication Data

US 2024/0397290 A1    Nov. 28, 2024

(51) Int. Cl.
*H04W 4/12* (2009.01)
*H04W 64/00* (2009.01)

(52) U.S. Cl.
CPC ............. *H04W 4/12* (2013.01); *H04W 64/00* (2013.01)

(58) Field of Classification Search
CPC ........ H04W 4/12; H04W 64/00; H04W 4/029
See application file for complete search history.

(56) References Cited

U.S. PATENT DOCUMENTS

| 6,961,562 | B2 | 11/2005 | Ross |
| 7,010,002 | B2 | 3/2006 | Chow et al. |
| 7,039,440 | B2 | 5/2006 | Rodriguez et al. |
| 7,171,217 | B2 | 1/2007 | Beuck |
| 7,239,871 | B2 | 7/2007 | Shamp et al. |
| 7,249,100 | B2 | 7/2007 | Murto et al. |
| 7,532,899 | B2 | 5/2009 | Wilson et al. |
| 7,646,740 | B2 | 1/2010 | Crolley et al. |
| 7,953,815 | B2 | 5/2011 | Kaufman et al. |
| 7,970,648 | B2 | 6/2011 | Gailey et al. |

(Continued)

FOREIGN PATENT DOCUMENTS

| CN | 100450266 C | 1/2009 |
| CN | 110192400 A | 8/2019 |

(Continued)

*Primary Examiner* — Habte Mered
(74) *Attorney, Agent, or Firm* — Perkins Coie LLP

(57) ABSTRACT

A server system associated with a telecommunications network can determine a first location of a wireless device based on a cellular signal. The system determines whether the first location of the wireless device is within a predetermined distance from any entity location of multiple entity locations. The database can store location information for the multiple entities. The system can determine whether the wireless device has remained at the first location for longer than a threshold time based on the cellular signal received from the wireless device. In response to determining that the wireless device has remained at the first location for longer than the threshold time and that the first location of the wireless device is within the predetermined distance from a first entity associated with a first entity location, the wireless device can present information associated with the first entity to a user of the wireless device.

20 Claims, 5 Drawing Sheets

(56)                References Cited

U.S. PATENT DOCUMENTS

| | | | |
|---|---|---|---|
| 8,000,719 | B1 | 8/2011 | Lambert |
| 8,165,561 | B2 | 4/2012 | Cai et al. |
| 8,175,514 | B2 | 5/2012 | Lee |
| 8,364,171 | B2 | 1/2013 | Busch |
| 8,437,776 | B2 | 5/2013 | Busch |
| 8,447,331 | B2 | 5/2013 | Busch |
| 8,467,807 | B1 * | 6/2013 | Dalit ..................... H04W 4/021 |
| | | | 725/23 |
| 8,483,705 | B1 | 7/2013 | Cope et al. |
| 8,515,459 | B2 | 8/2013 | Busch |
| 8,566,236 | B2 | 10/2013 | Busch |
| 8,768,379 | B2 | 7/2014 | Busch |
| 8,862,159 | B2 | 10/2014 | Cohen-Zur |
| 8,914,042 | B2 | 12/2014 | Singhal |
| 8,918,120 | B2 | 12/2014 | Singhal |
| 8,996,035 | B2 | 3/2015 | Busch |
| 9,008,691 | B2 | 4/2015 | Busch |
| 9,106,768 | B2 | 8/2015 | Mohammed et al. |
| 9,178,991 | B2 | 11/2015 | Finnegan et al. |
| 9,514,463 | B2 | 12/2016 | Grigg et al. |
| 9,918,196 | B2 | 3/2018 | Reed et al. |
| 9,967,353 | B2 | 5/2018 | Singhal |
| 9,973,470 | B2 | 5/2018 | Singhal |
| 10,009,255 | B2 | 6/2018 | Singhal |
| 10,332,153 | B1 * | 6/2019 | Mayers .............. G06Q 30/0257 |
| 10,628,464 | B2 | 4/2020 | Finnegan et al. |
| 10,812,937 | B2 | 10/2020 | Mittal et al. |
| 2001/0046862 | A1 | 11/2001 | Coppinger et al. |
| 2002/0037709 | A1 | 3/2002 | Bhatia et al. |
| 2002/0090932 | A1 | 7/2002 | Bhatia et al. |
| 2002/0184089 | A1 | 12/2002 | Tsou et al. |
| 2003/0195814 | A1 | 10/2003 | Striemer |
| 2004/0002386 | A1 | 1/2004 | Wolfe et al. |
| 2004/0117225 | A1 | 6/2004 | Fridman |
| 2006/0009194 | A1 | 1/2006 | Ross |
| 2006/0166684 | A1 | 7/2006 | Karaoguz et al. |
| 2006/0178932 | A1 | 8/2006 | Lang |
| 2007/0136086 | A1 | 6/2007 | Luerssen |
| 2008/0040281 | A1 | 2/2008 | Chakraborty et al. |
| 2009/0191899 | A1 | 7/2009 | Wilson et al. |
| 2011/0288911 | A1 | 11/2011 | Barnes |
| 2012/0289245 | A1 * | 11/2012 | Srinivasan .............. H04W 4/02 |
| | | | 455/456.1 |
| 2012/0290383 | A1 | 11/2012 | Busch |

| | | | |
|---|---|---|---|
| 2015/0087339 | A1 | 3/2015 | Kuhlmann |
| 2015/0213081 | A1 | 7/2015 | Singhal |
| 2015/0242871 | A1 | 8/2015 | Ortiz et al. |
| 2017/0244795 | A1 | 8/2017 | Coffing |
| 2018/0011863 | A1 | 1/2018 | Xin et al. |
| 2020/0167826 | A1 * | 5/2020 | Otsuka ................. G05D 1/0223 |
| 2023/0353977 | A1 * | 11/2023 | Griesmer ................ H04W 4/12 |
| 2025/0227651 | A1 * | 7/2025 | Kumar .................. H04W 64/00 |

FOREIGN PATENT DOCUMENTS

| | | |
|---|---|---|
| DE | 202009000648 U1 | 4/2009 |
| DE | 102015121300 A1 | 6/2017 |
| EP | 1319301 A2 | 6/2003 |
| EP | 1319302 A2 | 6/2003 |
| EP | 2148293 A1 | 1/2010 |
| EP | 2374074 A1 | 10/2011 |
| EP | 1518435 B1 | 2/2012 |
| EP | 2705664 A2 | 3/2014 |
| EP | 3084711 A1 | 10/2016 |
| EP | 2936867 B1 | 11/2018 |
| JP | 2005530430 A | 10/2005 |
| JP | 4084088 B2 | 2/2008 |
| JP | 2010505370 A | 2/2010 |
| JP | 5660445 B2 | 12/2014 |
| JP | 5832974 B2 | 11/2015 |
| JP | 6129880 B2 | 5/2017 |
| JP | 2018514762 A | 6/2018 |
| KR | 20070052631 A | 5/2007 |
| KR | 101509570 B1 | 4/2015 |
| KR | 20160015551 A | 2/2016 |
| WO | 02093290 A2 | 11/2002 |
| WO | 2006086378 A2 | 8/2006 |
| WO | 2008118334 A1 | 10/2008 |
| WO | 2010068927 A1 | 6/2010 |
| WO | 2011005217 A2 | 1/2011 |
| WO | 2013016909 A1 | 2/2013 |
| WO | 2014072989 A1 | 5/2014 |
| WO | 2014078580 A2 | 5/2014 |
| WO | 2014151711 A1 | 9/2014 |
| WO | 2015092795 A1 | 6/2015 |
| WO | 2016161020 A1 | 10/2016 |
| WO | 2016176071 A1 | 11/2016 |
| WO | 2018118755 A1 | 6/2018 |
| WO | 2018175895 A1 | 9/2018 |

* cited by examiner

210

300

400

402 Determine first location of wireless device

404 Determine whether the first location is within predetermined distance from any business locations

406 Determine whether the wireless device has remained at first location longer than threshold time

408 Present information associated with first business by wireless device

500

TELECOMMUNICATIONS-ASSISTED SYSTEM FOR PRESENTING PROXIMITY DEPENDENT OFFERINGS OF ENTITIES AT WIRELESS DEVICES

BACKGROUND

Ordering items online for in-person pickup has become a highly popular service among entities such as restaurants, cafés, grocery stores, and retail stores. In particular, using a mobile phone application for online orders has proved to be an efficient and convenient technology for customers. For example, a customer can select items for purchase from a local restaurant from a list or a menu on their mobile phone, complete payments for the selected items, and arrive at the restaurant simply to pick up the purchased items. Similarly, the entity can timely receive orders electronically without the need of having a person at a counter receiving orders or phone calls.

BRIEF DESCRIPTION OF THE DRAWINGS

Detailed descriptions of implementations of the present invention will be described and explained through the use of the accompanying drawings.

Figure 1:
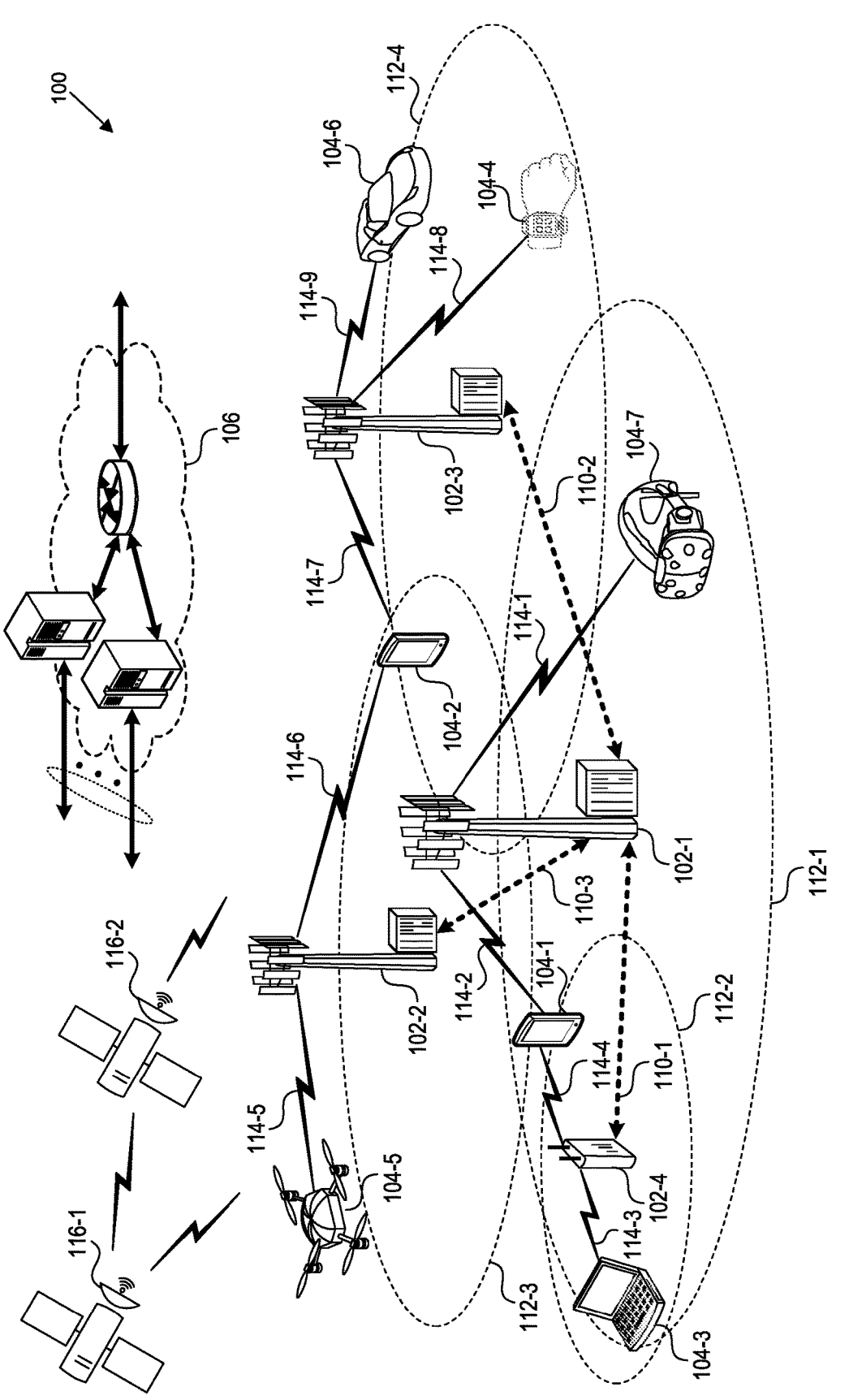
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for a location-based online ordering system for enhanced user experience. The ordering system provides a user with wireless device notifications (e.g., pop-up notifications on their mobile phone) associated with nearby entities based on their location. The entities can include, for example, a merchants, businesses, or organizations The location of the wireless device is tracked based on a cellular signal received from the wireless device. The ordering system can compare the location of the wireless device with the locations of multiple entities stored in a database. The database can be configured to store locations of multiple entities as well as other useful information such as menus or lists of items for purchase, prices, promotions, and opening hours. When the wireless device is matched with one or more nearby entities (e.g., restaurants or stores), the wireless device displays a notification that allows the user to access an online ordering user interface associated with the one or more nearby entities. The wireless device can also display other information retrieved from the database. The user can purchase items, pay for them, and proceed to pick up the items from the respective entity location. The present technology thereby provides a user-friendly and efficient way of accessing online ordering based on the user's location.

In one example, a server system associated with a telecommunications network is configured to communicate with a database and a wireless device. The server system can determine a first location of the wireless device based on a cellular signal received from the wireless device. The server system can determine whether the first location of the wireless device is within a predetermined distance from any entity location of the multiple entity locations by querying the database. The database stores location information for multiple entities. The server system can determine whether the wireless device has remained at the first location for longer than a threshold time based on the cellular signal received from the wireless device. In response to determining that the wireless device has remained at the first location for longer than the threshold time and that the first location of the wireless device is within the predetermined distance from a first entity associated with a first entity location of the multiple entity locations, the server system can cause the wireless device to present information associated with the first entity to a user of the wireless device.

In another example, a server system associated with a telecommunications network is configured to communicate with a database and a wireless device. The server system can determine a first location of the wireless device based on a cellular signal received from the wireless device. The server system can determine whether the first location of the wireless device is within a predetermined distance from any entity location of the multiple entity locations by querying the database. The database can store location information for multiple entities. In response to determining that the first location of the wireless device is within the predetermined distance from a first entity associated with a first entity location of the multiple entity locations, the server system can cause the wireless device to present information associated with the first entity to a user of the wireless device.

In yet another example, a wireless device associated with a telecommunications network is configured to communicate with a server system associated with a telecommunications network. The device can periodically forward a cellular signal to the server system and cause the server system to determine a first location of the wireless device based on the cellular signal. The device can cause the server system to determine whether the first location of the wireless device is within a predetermined distance from any entity location of multiple entity locations by querying a database in communication with the server system. The database can include location information for the multiple entities. The device can cause the server system to determine whether the wireless device has remained at the first location for longer than a threshold time based on the cellular signal received from the wireless device. The device can receive an indication to present information associated with a first entity associated with a first entity location to a user of the wireless device from the server system. The server system can send the indication to the wireless device in response to a determination that the wireless device has remained at the first location for longer than the threshold time and that the first location of the wireless device is within the predetermined distance from the first entity associated with the first entity location of the multiple entity locations. The device can present the information associated with the first entity to the user of the wireless device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail so as to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Location-Based Online Ordering System

Figure 2:
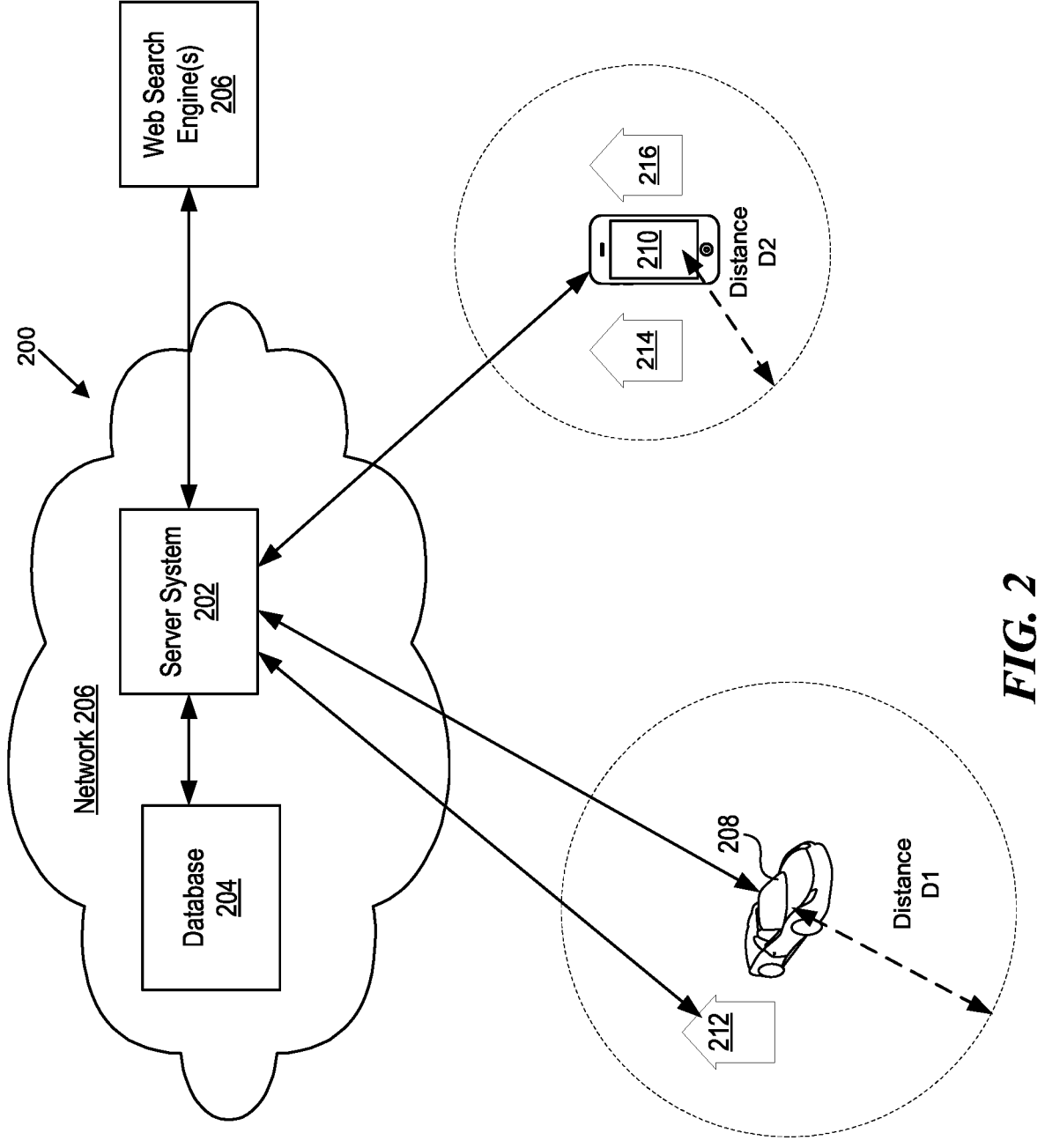
FIG. 2 is a block diagram that illustrates a location-based online ordering system.

FIG. 2 is a block diagram that illustrates a location-based online ordering system 200. The system 200 includes a server system 202 and a database 204. The server system 202 is associated with a telecommunications network service provider (e.g., service provider associated with the network 100 in FIG. 1). The server system 202 is in communication with multiple wireless devices (e.g., wireless devices 208 and 210). The server system is also in communication with multiple entities (e.g., entities 212, 214, 216) and optionally a web search engine 206.

The server system 202 is configured to enable communications between the multiple wireless devices 208 and 210 and the multiple entities 212, 214, and 216 to facilitate online ordering. The multiple entities 212, 214, and 216 and the multiple wireless devices 208 and 210 can be associated with the network service provider. For example, the wireless devices 208 and 210 and entities 212, 214, and 216 are associated with subscribers for services provided by the network service provider.

The entities 212, 214, and 216 can include merchants and businesses, such as restaurants, coffee shops, retail stores, grocery stores, pharmacies, or any other type of entities that provide items for sale. The entities 212, 214, and 216 can also include any other organizations (e.g., museums, government agencies, educational organizations). The entities 212, 214, and 216 have subscribed to a service provided by the network service provider that allows them to receive online orders from customers via a software application (e.g., a software application operated by a wireless device).

The wireless devices 208 and 210 can include the software application that allows a user to review information associated with the entities 212, 214, and 216 and, for example, place online orders for items to be picked up at the entities 212, 214, and 216. In some implementations, the wireless device is a mobile phone, a tablet computer, or a laptop (e.g., the wireless device 210). In some implementations, the wireless device is incorporated in a vehicle (e.g., the wireless device 208 is incorporated in a car). For example, the wireless device is a car associated with a subscriber identity module (SIM) (e.g., the wireless device 208 is incorporated in a car). In some implementations, the wireless device is a mobile phone that is configured to communicate with a car (e.g., via Bluetooth connection or wireless connection).

In order to save UE battery, the positioning information of wireless devices 208 and 210 can or shall only be tracked/requested on those cells or sectors of eNB/gNB that have been determined to be in proximity of or provide radio coverage around areas in and around entities 212, 214, and 216 The server system 202 can be configured to track respective locations of the multiple wireless devices (e.g., the wireless devices 208 and 210). Tracking of a wireless device is a process for identifying a location of the wireless device. The location tracking can be performed based on cellular signals received from the wireless devices. The wireless device may be stationary or moving during the process. Tracking may be enabled by a number of technologies, such as multilateration (e.g., triangulation) of radio signals between multiple signal sources (e.g., cell towers of a network or Wi-Fi access points) (e.g., base stations 102 in FIG. 1) and the phone or by using the Global Positioning System (GPS). Multilateration determines a position based on the measurement of the times of flight (TOFs) or a time difference of arrival (TDOA) of energy waves (radio, acoustic, seismic, etc.) having a known waveform and speed when propagating either from or to the stations. The signal sources are at known locations and have synchronized clocks. Multilateration determines a location of the wireless device based on distances or absolute measurements of the TOF of signals received by the wireless device from three or more cellular stations. Similar techniques can be applied to determine the position of the wireless device indoors based on signals from radio frequency (RF) beacons and Wi-Fi MAC points.

The server system 202 is configured to communicate with the database 204 to store and retrieve data from the database 204. The database 204 is configured to, for example, store data that describes location information (e.g., addresses and/or global coordinates) associated with the entities 212, 214, and 216. For example, the database can include a correlation between GPS latitude/longitude coordinates with telecommunication relay service (TRS), gNB cellular base station identifiers (gNB Cell ID), and observed time difference of arrival (OTDOA) locations. The database 204 can further store other information associated with the entities 212, 214, and 216, such as map, contact information, promotion information, opening hours, website links, or associated images. The server system 202 can retrieve the location information and/or other information from the database 204 and use the information to facilitate location-based online ordering services to the wireless devices 208 and 210.

In some implementations, the server system 202 is in further communication with one or more web search engines 206. The server system 202 can, for example, request the one or more web search engines 206 to provide information (e.g., location information or other information) associated with the entities 212, 214, and 216 based on a keyword search. The server system 202 can retrieve the information from the one or more web search engines 206 and store the information in the database 204.

The system 200 is configured to provide for a location-based online ordering system for enhanced user experience. As an example, the server system 202 tracks the location of multiple wireless devices (e.g., the wireless devices 208 and 210) using cellular signals received from the devices. Concurrently, the server system 202 requests the database 204 to identify entity locations (e.g., the entities 212, 214, and 216) that are within predetermined distances from the wireless devices (e.g., distance D1 associated with wireless device 208 and distance D2 associated with wireless device 210). When the server system 202 determines that a wireless device is at a particular location and has stayed there for longer than a threshold time (e.g., 30 seconds), the server system 202 causes the wireless device to display a user interface that includes information related to a nearby business. In some implementations, the user interface is a pop-up notification displayed on a display of the wireless device. For example, the server system 202 determines that the entity 212 is within the predetermined distance D1 from the wireless device 208 and accordingly causes the wireless device to display a user interface providing information about the entity 212. In another example, the server system 202 determines that entities 214 and 216 are within the predetermined distance D2 from the wireless device 210 and accordingly causes the wireless device to display a user interface providing information about the entities 214 and 216. In particular, the displayed user interfaces allow a user to place an online order for items from the respective entities. The user can place the order for the nearby entity and conveniently arrive to the entity location to pick up the order. It is noted that the entities 212, 214, and 216 are separate and not, for example, part of a common restaurant or store chain. The server system 202 thereby allows a user to conveniently access online ordering based on a common GUI interface for multiple vendors as local offerings (as position has already been determined) to his or her location rather than using multiple software applications specific to a particular business, and additionally having to choose location through state, city, zip code etcetera to be serviced with local options. It also provides a convenient uniform interface for ordering across multiple businesses.

Figure 3:
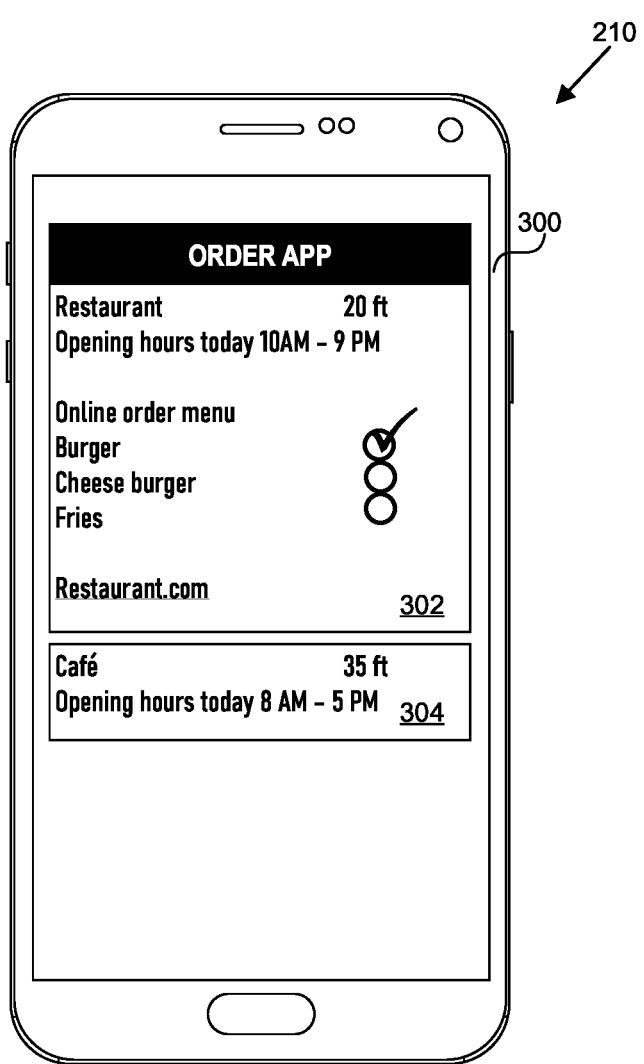
FIG. 3 is a block diagram that illustrates an exemplary user interface for an online ordering wireless device application.

FIG. 3 is a schematic illustration of an exemplary user interface 300 for online ordering on a wireless device application. The user interface 300 (e.g., a graphical user interface) is associated with a software application running on a wireless device, such as wireless device 210 in FIG. 3. The software application allows communication between the wireless device 210 and the server system 202 described with respect to FIG. 2. The user interface 300 can be displayed by the wireless device 210 in response to the server system 202 determining that the wireless device is located nearby (e.g., within a predetermined distance) from an entity called "Restaurant" (e.g., associated with a portion 302 of the user interface 300) or an entity called "Café" (e.g., a portion 304 of the user interface 300). In some implementations, the user interface 300 is a pop-up user interface (or a pop-up notification) referring to a graphical element that communicates certain events or information to the user.

The user interface 300 can allow the user to access one or more features associated with online services for entities. For example, the user interface 300 includes an online ordering user interface (e.g., as shown in the portion 302 of the user interface 300), an interactive map, contact information, payment information, promotion information, opening hours (e.g., as shown in the portion 304 of the user interface 300), a website (e.g., a link to a website associated with "Restaurant" in the portion 302 of the user interface 300), images associated with the first business, a distance between the entity and wireless device (e.g., the distance between the wireless device location and "Restaurant" is 20 feet). The user interface 300 allows the user to provide inputs to perform actions, such as reviewing the information associated with the entities or placing an online order.

Figure 4:
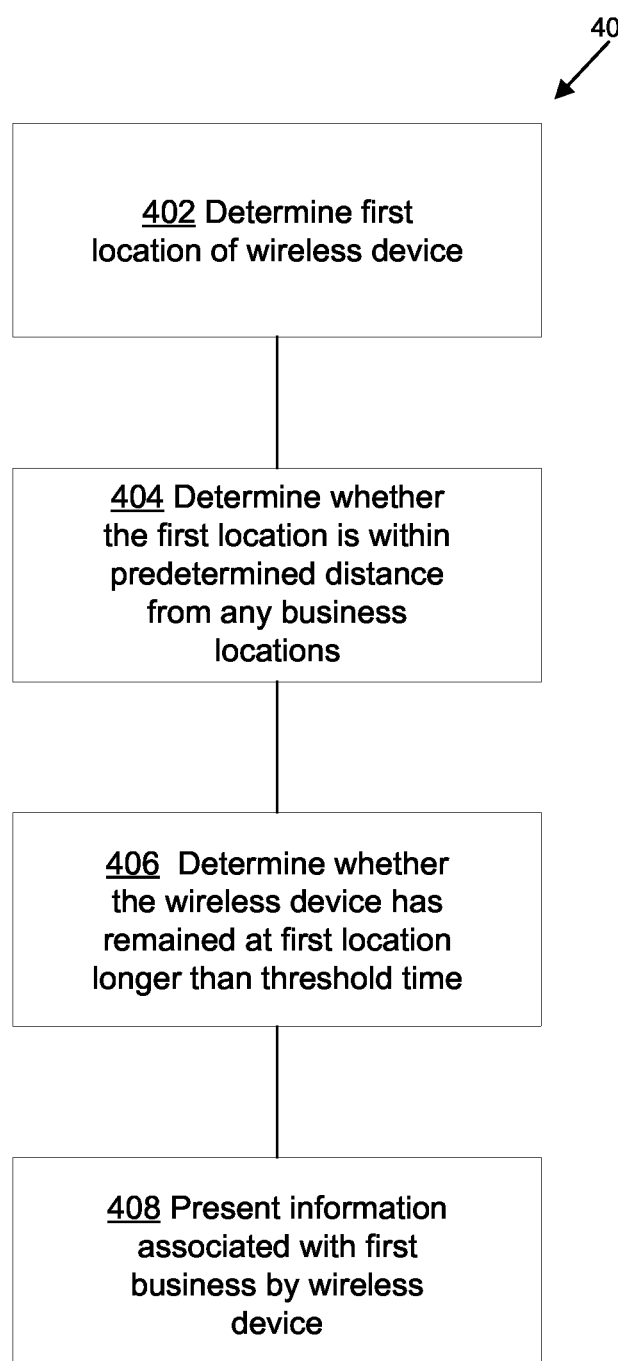
FIG. 4 is a flowchart that illustrates processes for online ordering.

FIG. 4 is a flowchart that illustrates processes for online ordering. The processes 400 can be performed by a location-based online ordering system (e.g., the system 200 in FIG. 2). The system includes a server system (e.g., the server system 202) in communication with a database (e.g., the database 204 in FIG. 2) in communication with multiple wireless devices (e.g., the wireless devices 208 and 210) and multiple entities (e.g., entities 212, 214, and 216). The server system can be associated with a telecommunications network and include at least one hardware processor and at least one non-transitory memory storing instructions (e.g., the computer system 500 described with respect to FIG. 5). When the instructions are executed by the at least one hardware processor, the server system performs the processes 400. The system is configured to allow users of the wireless devices to conveniently access information associated with entities that are located nearby the respective wireless devices and facilitate online orders made by the users to the entities.

At 402, the server system can determine a first location of the wireless device based on a cellular signal received from the wireless device. In some implementations, the wireless device is incorporated in a vehicle (e.g., the wireless device 208 in FIG. 2) such as a car. In some implementations, the wireless device is a mobile phone, a tablet computer, a laptop computer, or a smartwatch (e.g., the wireless device 210 in FIG. 2 is a mobile phone). In some implementations, the mobile phone is in communication with a vehicle via, for example, a Bluetooth connection or V2X side link communication. For example, a user can communicate with an online ordering software application associated with the server system 202 operating on the mobile phone via the vehicle's display.

The server system can be configured to track the location of the wireless device periodically based on the cellular signals from the wireless device. The tracking can allow the server system to define the location of the wireless device with a certain accuracy whether the wireless device is moving or not moving. For example, the server system can track the location of the wireless device when a user is driving a car. In some implementations, determining the first location of the wireless device can include determining the distance of the wireless device from three or more cell sites associated with the telecommunications network (e.g., the base stations 102 in FIG. 1). For example, the distance can be determined by calculating a TDOA between the wireless device and the three or more cell sites. In one example, the frequency of determining location is based on TDOA every 5 secs.

In some implementations, the first location of the wireless device includes a vertical distance of the wireless device (e.g., a distance from the ground level) in addition to horizontal distance (e.g., latitude and longitude coordinates along the ground). For example, the TDOA technology allows the server system to track the vertical distance such that the server system can determine on which floor of a multi-floor building the wireless device is located. The multi-floor building can be, for example, a multi-floor shopping mall. The vertical distance can correspond to the floor number on which the wireless device is located.

In some implementations, the server system can track the location of the wireless device based on GPS signaling or other wireless device tracking technologies.

At 404, the server system can determine whether the first location of the wireless device is within a predetermined distance (e.g., distances D1 and D2 in FIG. 2) from any entity location of multiple entity locations. The determining can include querying the database. In some implementations, the predetermined distance is 250, 150, 100, 75, 50, 25, 20, 15, 10, or 5 meters or less. The predetermined distance can be configurable based on the characters of the region where the wireless device is located. For example, in a rural area or an area with less densely located entities, the predetermined distance can be 250 meters while in a commercial area of a city or inside a shopping mall the predetermined distance can be less (e.g., even 5 meters or less).

In some implementations, when the server system determines that the wireless device is in communication with a particular gNB base station (e.g., the base stations 102 in FIG. 1), the server system can perform a query at the database, based on the gNB base station, for entities located nearby the wireless device.

The multiple entity locations can be associated with different entities (e.g., restaurants, coffee shops, grocery stores, retail stores, and pharmacies). The present technology can thereby offer a system that allows a user to place online orders at multiple, unassociated entities with a single software application.

The database is configured to store location information for multiple entities. The database can include data that correlates the multiple entity locations (e.g., identified based on an address or GPS coordinates) with TRS, gNB Cell IDs, and OTDOA locations. The database retrieves the store location's position information, and converts it into a latitude/longitude location, for query and placement into a database, which maps data by geo-bins. Furthermore, the geo-bin sizes can or shall vary, determined by rural, city or shopping mall, etcetera type of location. For example, the server system can determine the first location of the wireless device as an OTDOA location. The server system can then inquire the database to identify entity locations that are nearby the wireless device (e.g., within a predetermined distance) based on the OTDOA location. The server system can, for example, perform a look-up at the database based on the OTDOA location of the wireless device, by matching the user's geo-position with a specific geo-bin. The server then encapsulates this specific business's local offerings and data to be provided to the wireless device and sends it to the serving gNB. The gNB will send an additional IE via the IMS layer to the wireless device. The wireless device reads the IMS message, and the corresponding listing is decoded by the application on the wireless device, which then populates the business's local offerings as a pop-up on the wireless device.

In some implementations, the database is generated by the server system (e.g., the server system is configured to retrieve relevant information and store the information at the database). In one example, the server system receives information relevant to the respective entities from multiple entities (e.g., the entities 212, 214, and 216). The server system can forward the information relevant to the respective entities to the database for storing. In some implementations, the server system acquires information relevant to multiple entities by using a web-based search engine (e.g., the one or more web search engines 206 in FIG. 2). The database further retrieves information related to nearby locations (e.g., the TRS, gNB Cell IDs, and OTDOA) and correlates the information with the location information associated with the multiple entities. In one example, the server system 202 is programmed to periodically (e.g., every 7 days) search for all known locations of specific types of businesses and this information is sorted by country, state, city, and zip code. The server system 202 dumps/updates this data categorically into the database 204. The server system, then searches the store location's position information using the web, acquires it and converts it into a latitude/longitude location, for query and placement into a database, which maps data by geo-bins. Furthermore, the geo-bin sizes can or shall vary, determined by rural, city or shopping mall, and other type of location. Further, when a collaboration with the stores or businesses exists, this same location information can also be initially fed manually (one time) or via API integration with store businesses, into the data base 204, and additional programing on the server system 202 continues to automatically update store offerings (e.g., weekly frequency) via either web search or further collaborative partnership with the businesses directly.

At 406, the server system can determine whether the wireless device has remained at the first location for longer than a threshold time based on the cellular signal received from the wireless device. In some implementations, the threshold time is at least 15 seconds, 30 seconds, or 45 seconds. The determination that the wireless device has remained at the first location for longer than the threshold time is useful in preventing the wireless device from displaying notifications too frequently. For example, if the user is driving a car and the location of the wireless device is moving at a significant speed, the user is likely not able to receive the notifications. Instead, the user can be more perceptible to receive the notifications when they stop at a traffic light or park the car.

At 408, in response to a determination that the wireless device has remained at the first location for longer than the threshold time and that the first location of the wireless device is within the predetermined distance from a first entity associated with a first entity location of the multiple entity locations, the wireless device can present information associated with the first entity to a user of the wireless device (e.g., as described with respect to the user interface 300 in FIG. 3). For example, the wireless device 210 in FIG. 2 is located nearby the entities 214 and 216 (e.g., the entities 214 and 216 are within the predetermined distance D2 from the wireless device 210). The wireless device 210 can display user interfaces associated with the entities 214 and 216 (e.g., the portions 302 and 304 of the user interface 300 in FIG. 3).

In some implementations, presenting information associated with the first entity by the wireless device includes displaying an online ordering user interface associated with the first entity (e.g., the portion 302 of the user interface 300 in FIG. 3). The server system can receive an indication that the user of the wireless device has placed an order for items to be picked up from the first entity at the first entity location from the wireless device. The server system can forward the indication to the first entity associated with the first entity location. In response to the indication, the first entity associated with the first entity location can prepare the ordered items for pickup.

In some implementations, presenting information associated with the first entity by the wireless device includes displaying a pop-up user interface on a display of the wireless device by a software application operated on the wireless device. In response to a user input on the wireless device, the pop-up user interface can allow the user to access one or more of an online ordering user interface, an interactive map, contact information, payment information, promotion information, opening hours, a website, or images associated with the first business. As an example, a user of a mobile phone is driving in a car. As the car stops at a traffic light, the wireless device can display a user interface (on a display of a mobile phone and/or the car) including information related to multiple nearby restaurants. The user can efficiently access an online ordering user interface to a restaurant of the user's interest and even place an order while being stopped at the traffic light. The user can then drive to the restaurant location and pick up his or her order.

In some implementations, the server system can determine a second location of the wireless device based on the cellular signal (e.g., the wireless device has moved from the first location to the second location). In response to determining that the wireless device has moved away from the predetermined distance from the first entity location based on the second location of the wireless device, the wireless device can cease to present the information associated with the first entity location to the user of the wireless device.

In response to a determination that the second location of the wireless device is closer to the first entity location than the second entity location, i.e., the wireless device has moved closer to the first entity location than the second entity location based on the second location of the wireless device, the wireless device can cease to present the information associated with the second entity associated with the second entity location while maintaining to present the information associated with the first entity associated with the first entity location. For example, the wireless device can determine that the user is more likely interested in purchasing items from the first entity because they are moving closer to the first entity location than the second entity location. The wireless device thereby displays information only for the entity that the user is more likely interested in.

In some implementations, the wireless device can display information associated with multiple nearby entities. For example, in response to the determination that the wireless device has remained at the first location for longer than the threshold time and that the first location of the wireless device is within the predetermined distance from the first entity location and a second entity location of the multiple entity locations, the wireless device can concurrently present information associated with the first entity associated with the first entity location and a second entity associated with the second entity location to the user of the wireless device (e.g., the user interface 300 includes the portion 302 associated with "Restaurant" and the portion 304 associated with "Café").

In some implementations, the user of the wireless device is a subscriber of a network service provider associated with the telecommunications network. Presenting information associated with the first entity by the wireless device can include displaying an online ordering user interface associated with the first business. The server system can further receive an indication that the user of the wireless device has placed an order for items to be picked up from the first entity at the first entity location from the wireless device. The server system can cause a payment required for the ordered items to be added to a periodic invoice associated with the user's subscription for the network service. Such feature can offer a convenient payment option for the user when placing an online order via the wireless device software application. Without the need of entering credit card information for each of the orders for multiple different entities, the user can charge the purchased items to the user's wireless subscription account and pay them in a monthly payment.

Computer System

Figure 5:
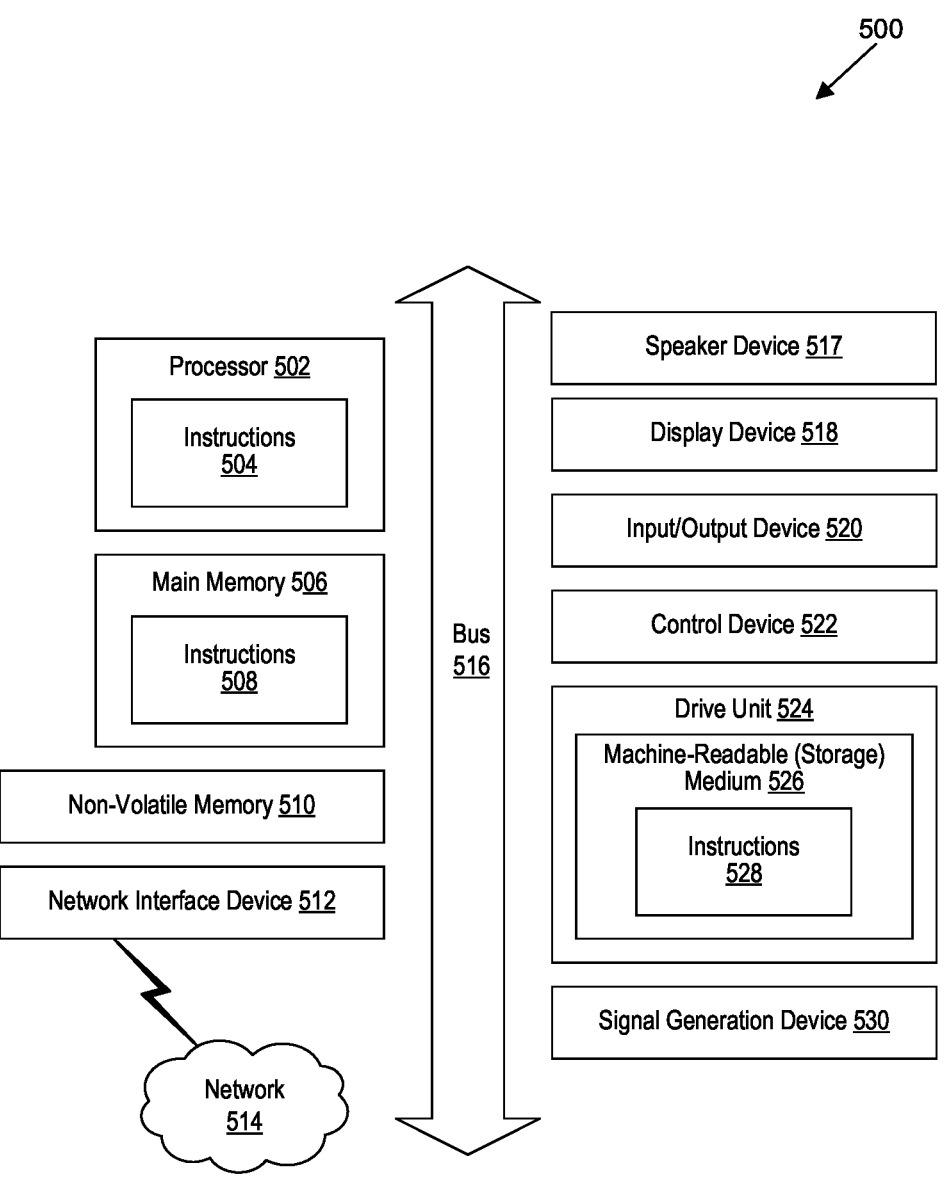
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, speaker device 517, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode. In some implementations, the computer system corresponds to the wireless device 210, the wireless device 208 (e.g., an embedded system within a vehicle), the server system 202, the database 204, and/or the one or more web search engines 206 described with respect to FIG. 2.

The network interface device 512 enables the computer system 500 to mediate data in a network 514 with an entity that is external to the computer system 500 through any communication protocol supported by the computer system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A server system associated with a telecommunications network, the server system being configured to communicate with a database and a wireless device, the server system comprising:

at least one hardware processor; and at least one non-transitory memory storing instructions, which, when executed by the at least one hardware processor, cause the server system to:

determine a first location of the wireless device based on a cellular signal received from the wireless device while on the telecommunications network;

determine, by querying the database, whether the first location of the wireless device is within a predetermined distance from any entity location of multiple entity locations, wherein the database stores location information for the multiple entities;

determine whether the wireless device has remained at the first location for longer than a threshold time based on the cellular signal received from the wireless device while on the telecommunications network;

in response to determining that the wireless device has remained at the first location for longer than the threshold time and that the first location of the wireless device is within the predetermined distance from a first entity associated with a first entity location of the multiple entity locations, cause the wireless device to present information associated with the first entity to a user of the wireless device.

2. The server system of claim 1, further caused to:

subsequent to determining the first location of the wireless device, determine a second location of the wireless device based on the cellular signal;

in response to determining, based on the second location of the wireless device, that the wireless device has moved away from the predetermined distance from the first entity location, cease to present the information associated with the first entity location to the user of the wireless device.

3. The server system of claim 1, wherein to determine the first location of the wireless device comprises causing the server system to:

determine a distance of the wireless device from three or more cell sites associated with the telecommunications network by calculating a time difference of arrival (TDOA) between the wireless device and the three or more cell sites.

4. The server system of claim 1, further caused to:

in response to the determination that the wireless device has remained at the first location for longer than the threshold time and that the first location of the wireless device is within the predetermined distance from the first entity location and a second entity location of the multiple entity locations, concurrently present information associated with the first entity associated with the first entity location and a second entity associated with the second entity location to the user of the wireless device.

5. The server system of claim 1:

wherein the server system is in further communication with the first entity;

wherein to present information associated with the first entity by the wireless device includes displaying an online ordering user interface associated with the first entity; and wherein the server system is further caused to:

receive, from the wireless device, an indication that the user of the wireless device has placed an order for items to be picked up from the first entity at the first entity location;

forward the indication to the first entity associated with the first entity location; and cause the first entity associated with the first entity location to prepare the ordered items for pickup.

6. The server system of claim 1:

wherein the user of the wireless device is a subscriber of a network service provider associated with the telecommunications network;

wherein to present information associated with the first entity by the wireless device includes displaying an online ordering user interface associated with the first entity; and wherein the server system is further caused to:

receive, from the wireless device, an indication that the user of the wireless device has placed an order for items to be picked up from the first entity at the first entity location; and cause a payment required for the ordered items to be added to a periodic invoice associated with the user's subscription for the network service.

7. The server system of claim 1:

wherein the first location of the wireless device includes a vertical distance of the wireless device; and wherein when the wireless device is located inside a multi-floor building, the vertical distance corresponds to a number associated with a floor on which the wireless device is located.

8. The server system of claim 1, wherein:

the wireless device is incorporated in a vehicle or is a mobile phone in communication with the vehicle.

9. The server system of claim 1, wherein:

the threshold time is at least 30 seconds.

10. The server system of claim 1, wherein:

the predetermined distance is 15 meters or less.

11. The server system of claim 1, further caused to:

in response to determining that the wireless device has remained at the first location for longer than the threshold time and that the first location of the wireless device is within the predetermined distance from the first entity location and a second entity location of the multiple entity locations, concurrently present information associated with the first entity associated with the first entity location and a second entity associated with the second entity location to the user of the wireless device;

subsequent to determining the first location of the wireless device, determine a second location of the wireless device based on the cellular signal;

in response to determining, based on the second location of the wireless device, that the wireless device has moved closer to the first entity location than the second entity location, cease to present the information associated with the second entity associated with the second entity location while maintaining to present the information associated with the first entity associated with the first entity location.

12. The server system of claim 1, wherein:

the multiple entity locations are associated with different entities.

13. The server system of claim 1:

wherein to cause the wireless device to present information associated with the first entity includes causing a software application operated on the wireless device to display a pop-up user interface on a display of the wireless device; and wherein the pop-up user interface allows the user to access, in response to a user input on the wireless device, one or more of:

an online ordering user interface, an interactive map, contact information, payment information, promotion information, opening hours, a website, or images associated with the first business.

14. The server system of claim 1, further caused to:

receive, from multiple entities, information relevant to the respective entities; and forward the information relevant to the respective entities to the database for storing.

15. The server system of claim 1, further caused to:

acquire, by using a web-based search engine, information relevant to multiple entities; and forward the information relevant to the respective entities to the database for storing.

16. A method performed by a server system associated with a telecommunications network, the server system being configured to communicate with a database and a wireless device, the method comprising:

determining a first location of the wireless device based on a cellular signal received from the wireless device;

determining, by querying the database, whether the first location of the wireless device is within a predetermined distance from any entity location of multiple entity locations, wherein the database stores location information for the multiple entities;

in response to determining that the wireless device has remained at the first location for longer than the threshold time and that the first location of the wireless device is within the predetermined distance from a first entity associated with a first entity location of the multiple entity locations, causing the wireless device to present information associated with the first entity to a user of the wireless device.

17. The method of claim 16, further comprising:

subsequent to determining the first location of the wireless device, determining a second location of the wireless device based on the cellular signal;

in response to determining, based on the second location of the wireless device, that the wireless device has moved away from the predetermined distance from the first entity location, ceasing to present the information associated with the first entity location to the user of the wireless device.

18. The method of claim 16, wherein determining the first location of the wireless device comprises:

determining a distance of the wireless device from three or more cell sites associated with the telecommunications network by calculating a time difference of arrival (TDOA) between the wireless device and the three or more cell sites.

19. A wireless device associated with a telecommunications network, the wireless device being configured to communicate with a server system associated with a telecommunications network, the wireless device comprising:

at least one hardware processor; and at least one non-transitory memory storing instructions, which, when executed by the at least one hardware processor, cause the wireless device to:

periodically forward cellular signal to the server system;

cause the server system to determine a first location of the wireless device based on the cellular signal;

cause the server system to determine, by querying a database in communication with the server system, whether the first location of the wireless device is within a predetermined distance from any entity location of multiple entity locations, wherein the database includes location information for the multiple entities;

cause the server system to determine, based on the cellular signal, whether the wireless device has remained at the first location for longer than a threshold time based on the cellular signal received from the wireless device;

receive, from the server system, an indication to present information associated with a first entity associated with a first entity location to a user of the wireless device, wherein the server system sends the indication to the wireless device in response to a determination that the wireless device has remained at the first location for longer than the threshold time and that the first location of the wireless device is within the predetermined distance from the first entity associated with the first entity location of the multiple entity locations;

present the information associated with the first entity to the user of the wireless device.

20. The wireless device of claim 19:

wherein presenting information associated with the first entity includes displaying a pop-up user interface on a display of the wireless device; and wherein the pop-up user interface allows the user to access, in response to a user input on the wireless device, one or more of:

an online ordering user interface, an interactive map, contact information, payment information, promotion information, opening hours, a website, or images associated with the first business.

* * * * *